M. M. JONES.
COTTON PRESS.
No. 28,281.                 Patented May 15, 1860.
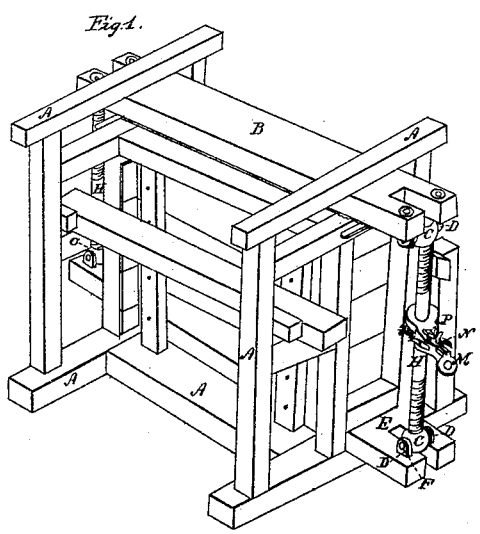
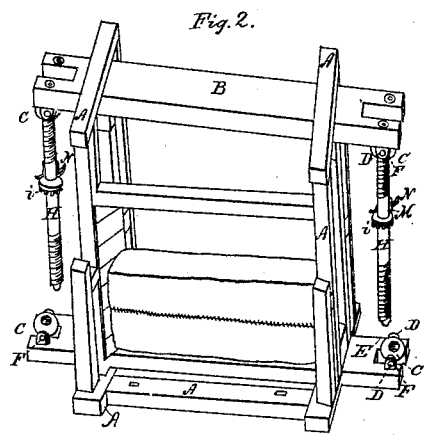
Witnesses.
A. W. Morse
Joseph Holton
Inventor.
M. M. Jones

UNITED STATES PATENT OFFICE.

M. M. JONES, OF MORRISVILLE, NEW YORK.

IMPROVEMENT IN COTTON-PRESSES.

Specification forming part of Letters Patent No. 28,281, dated May 15, 1860.

*To all whom it may concern:*

Be it known that I, M. M. JONES, of Morrisville, in the county of Madison and State of New York, have invented a new and useful improvement in implements or devices for consolidating various substances, and which I term a "Hop and Cotton Press;" and I do hereby declare that the following is a full, clear, and exact description of the same, reference being had to the accompanying drawings, making a part of this specification, in which—

Figure 1 is a perspective view representing the follower in position for pressing. Fig. 2 is also a perspective, representing the follower elevated and on one side.

Similar letters of reference denote like parts in both figures.

To enable others skilled in the art to fully understand and construct my invention, I will proceed to describe it.

A represents the frame of the press, which is of ordinary construction, and B is the follower. To the end of follower B, I connect what I term a "rotating nut," C, by means of bridle-pieces D D. A precisely similar device is connected with bed-piece E at each end. Said nuts are allowed to turn on their pivots F.

H represents a strong rod of iron with a right-hand screw on one end, a left-hand on the opposite. At or near the middle of rod H I connect to and surround said rod with a ratchet-roller, *i*. Said roller is rigidly connected to rod H.

M represents a pawl-lever; N, the pawl; O O, two springs acting upon pivot P, for the purpose of retaining said pawl in its proper position. By this improvement it will be seen that by the application of power to lever M the follower will descend with double velocity to what it would with a single thread, as heretofore constructed. By my improved mode of connecting the nuts C to the follower all torsion or twisting is prevented, thereby entirely preventing all lateral bind. Great advantages are also derived by connecting the leverage at or near the center of rod H, as it will be seen that a much smaller rod may be used than if the power were applied at the upper or lower end. The lever is also in a more convenient position to be acted upon.

Disclaiming any of the parts specially or in the abstract irrespective of the arrangement shown and described, what I claim as my invention, and desire to secure by Letters Patent, is—

The particular arrangement and combination of mechanism described, the same consisting of rods H, rotating nuts C, follower B, bed-piece E, lever M, pawl N, springs O O, pivot P, and stationary roller *i*, the several parts being constructed and arranged relatively as described, and for the purposes set forth.

M. M. JONES.

Witnesses:
A. W. MORSE,
JOSEPH HOLTON.